(12) United States Patent
Yoda

(10) Patent No.: US 7,926,369 B2
(45) Date of Patent: Apr. 19, 2011

(54) ACTUATOR

(75) Inventor: Mitsuhiro Yoda, Shiojiri (JP)

(73) Assignee: Seiko Epson Corporation (JP)

( * ) Notice: Subject to any disclaimer, the term of this patent is extended or adjusted under 35 U.S.C. 154(b) by 1210 days.

(21) Appl. No.: 11/472,263

(22) Filed: Jun. 21, 2006

(65) Prior Publication Data

US 2007/0025659 A1   Feb. 1, 2007

(30) Foreign Application Priority Data

Jun. 22, 2005 (JP) ................................ 2005-182626

(51) Int. Cl.
*B06B 3/00* (2006.01)
(52) U.S. Cl. .......................................................... 74/1 SS
(58) Field of Classification Search .................. 74/1 SS; 343/754, 755; 385/15; 310/12.01
See application file for complete search history.

(56) References Cited

U.S. PATENT DOCUMENTS

| | | | | |
|---|---|---|---|---|
| 5,543,956 | A * | 8/1996 | Nakagawa et al. | 359/225.1 |
| 7,095,156 | B2 * | 8/2006 | Yoda | 310/309 |
| 7,161,275 | B2 * | 1/2007 | Yoda | 310/309 |
| 7,382,510 | B2 * | 6/2008 | Yoda | 359/224.1 |
| 7,446,911 | B2 * | 11/2008 | Asai et al. | 358/481 |
| 7,649,301 | B2 * | 1/2010 | Yoda et al. | 310/309 |
| 2005/0116551 | A1 * | 6/2005 | Yoda | 310/36 |

FOREIGN PATENT DOCUMENTS

| | | |
|---|---|---|
| JP | A-10-85221 | 4/1998 |
| JP | T-2001-519726 | 10/2001 |
| JP | A-2004-29425 | 1/2004 |
| JP | T-2004-518992 | 6/2004 |
| JP | A-2004-191953 | 7/2004 |
| JP | T-2004-532425 | 10/2004 |
| WO | WO 98/06552 | 2/1998 |
| WO | WO 02/37165 | 5/2002 |
| WO | WO 02/077697 | 10/2002 |

OTHER PUBLICATIONS

Kawamura, et al., Research in Micromechanics Using Si, Proceedings of the Japan Society for Precision Engineering Autumn Conference (1986), p. 753.
K.E. Petersen, Silicon Torsional Scanning Mirror, IBMJ. Res. Develop., vol. 24 (1980), p. 631.

* cited by examiner

*Primary Examiner* — Vicky A Johnson
(74) *Attorney, Agent, or Firm* — Harness, Dickey & Pierce, P.L.C.

(57) ABSTRACT

The actuator has a movable mass portion and a pair of drive mechanisms for driving the movable mass portion. Each of the pair of drive mechanisms includes a drive mass portion, a support portion for supporting the drive mass portion, a first elastic connecting portion interconnecting the drive mass portion and the support portion so as to allow the drive mass portion to be pivoted about a pivotal axis with respect to the support portion, and a second elastic connecting portion interconnecting the drive mass portion and the movable mass portion so as to allow the movable mass portion to be pivoted about a pivotal axis with respect to the drive mass portion. The first elastic connecting portion includes a pair of bending bars opposed to each other with interposing the pivotal axis of the drive mass portion therebetween. The first elastic connecting portion includes a pair of piezoelectric elements jointed respectively onto the pair of bending bars so as to bend the pair of bending bars in opposite directions to cause pivotal movement to the drive mass portion. The pivotal movement of the drive mass portion causes torsional deformation to the second elastic connecting portion so as to pivot the movable mass portion.

17 Claims, 9 Drawing Sheets

ACTUATOR

CROSS-REFERENCE TO RELATED APPLICATION

This application claims priority to Japanese Patent Application No. 2005-182626 filed Jun. 22, 2006, which is hereby expressly incorporated by reference herein in its entirety.

BACKGROUND OF THE INVENTION

1. Field of the Invention

The present invention relates to an actuator, and more particularly to an actuator suitably used in an optical devices such as an optical scanner, an optical attenuator, and an optical switch.

2. Description of the Related Art

For example, polygon mirrors (rotary polyhedrons) are used as actuators for devices such as laser printers. In order to achieve high-speed printing with high resolution and high quality, it is necessary to rotate a polygon mirror at higher speeds. Currently, an air bearing is used to rotate a polygon mirror at high speeds with stability. However, it is difficult to further increase a rotational speed of a polygon mirror. Additionally, a large-sized motor is required to rotate a polygon mirror at high speeds. Such a large-sized motor is disadvantageous to miniaturization of the device. Further, use of such a polygon mirror needs a complicated structure and thus increases cost for the device.

There has been proposed an actuator having a relatively simple structure as shown in FIG. 1. The actuator shown in FIG. 1 employs a torsional vibrator having a single degree of freedom, in which flat electrode plates are arranged in parallel to each other. See K. E. Petersen, "Silicon Torsional Scanning Mirror," IBMJ. Res. Develop., vol. 24 (1980), p. 631. Further, there has also been proposed an electrostatic drive type vibrator having a single degree of freedom in which the aforementioned torsional vibrator is modified so as to have a cantilever structure. See Kawamura et al., "Research in Micromechanics Using Si," Proceedings of the Japan Society for Precision Engineering Autumn Conference (1986), p. 753.

The electrostatic drive type torsional vibrator with a single degree of freedom, as shown in FIG. 1, includes a glass substrate 1000, a movable electrode plate 300 made of monocrystal silicon, and spacers 200 disposed between the glass substrate 1000 and the movable electrode plate 300. The movable electrode plate 300 has fixing end portions 300a fixed to opposite ends of the glass substrate 1000 with the spacers 200 being interposed between the fixing end portions 300a of the movable electrode plate 300 and the glass substrate 1000. The movable electrode plate 300 has a movable electrode portion 300c and narrow torsion bars 300b for supporting the movable electrode portion 300c between the fixing end portions 300a. The torsional vibrator also includes a fixed electrode 400 disposed on the glass substrate 1000 so as to face the movable electrode portion 300c with a predetermined electrode interval. Specifically, the fixed electrode 400 is arranged in parallel to the movable electrode portion 300c. The torsional vibrator has a switch 600 and a power source 500 connected between the movable electrode plate 300 and the fixed electrode 400.

In the torsional vibrator thus constructed, when a voltage is applied between the movable electrode portion 300c and the fixed electrode 400, the movable electrode portion 300c is pivoted about the torsion bars 300b due to an electrostatic force. Since electrostatic attraction is inversely proportional to a square of an electrode interval, it is desirable that this type of electrostatic actuator has a small electrode interval between the movable electrode portion 300c and the fixed electrode 400. In the aforementioned structure having a single degree of freedom, however, the movable electrode portion 300c serves not only as an electrode but also as a movable portion. Accordingly, if an electrode interval is reduced, a movable range (rotational angle) of the movable electrode portion 300c is limited. On the other hand, a large electrode interval is required to maintain a large movable range. Thus, it is difficult to achieve both of low-voltage driving and a wide movable range (large deflection angle).

SUMMARY OF THE INVENTION

The present invention has been made in view of the above drawbacks. It is, therefore, an object of the present invention to provide an actuator which provides a large deflection angle with a compact structure even in a case of low-voltage driving.

According to an aspect of the present invention, there is provided an actuator which provides a large deflection angle with a compact structure in a case of low-voltage driving. The actuator has a movable mass portion and a pair of drive mechanisms for driving the movable mass portion. Each of the pair of drive mechanisms includes a drive mass portion, a support portion for supporting the drive mass portion, a first elastic connecting portion interconnecting the drive mass portion and the support portion so as to allow the drive mass portion to be pivoted about a pivotal axis with respect to the support portion, and a second elastic connecting portion interconnecting the drive mass portion and the movable mass portion so as to allow the movable mass portion to be pivoted about a pivotal axis with respect to the drive mass portion. The first elastic connecting portion includes a pair of bending bars opposed to each other with interposing the pivotal axis of the drive mass portion therebetween. Each of the pair of bending bars has a first connecting portion to the drive mass portion and a second connecting portion to the support portion. The first elastic connecting portion includes a pair of piezoelectric elements jointed respectively onto the pair of bending bars so as to bend the pair of bending bars in opposite directions to cause pivotal movement to the drive mass portion. The pivotal movement of the drive mass portion causes torsional deformation to the second elastic connecting portion so as to pivot the movable mass portion.

With the above arrangement, when the actuator is driven, the bending bars are subjected mainly to bending deformation so as to cause torsional deformation of the entire first elastic connecting portions. Accordingly, stresses produced in the first elastic connecting portions can be reduced so as to drive the drive mass portions with a large deflection angle.

Further, since the actuator obtains a driving force from the piezoelectric elements, the actuator can be driven with a relatively large driving force even in a case of low-voltage driving. Accordingly, spring constants of the first elastic connecting portions can be increased so as to drive the actuator at a high frequency even in the case of low-voltage driving.

Furthermore, since the actuator includes a pair of drive mechanisms for driving the movable mass portion, the drive mass portions and the movable mass portion can be driven smoothly.

Each of the pair of piezoelectric elements may include a piezoelectric layer mainly made of a piezoelectric material and a pair of electrodes holding the piezoelectric layer therebetween. One of the pair of electrodes is jointed to the bending bar. Thus, the bending bar can be bent reliably with a relatively simple structure by the piezoelectric element.

Each of the pair of piezoelectric elements may extend in a longitudinal direction of the bending bar and be capable of expansion and contraction in the longitudinal direction of the bending bar to bend the bending bar. Thus, the bending bar can be bent reliably with a relatively simple structure by the piezoelectric element.

Each of the pair of piezoelectric elements may be provided on at least one surface of the bending bar in a direction perpendicular to a longitudinal direction of the bending bar and perpendicular to a direction in which the pair of bending bars are opposed. With such an arrangement, the drive mass portions can be pivoted more smoothly by bending deformation of the bending bars.

Each of the pair of piezoelectric elements may be provided on both surfaces of the bending bar in a direction perpendicular to a longitudinal direction of the bending bar and perpendicular to a direction in which the pair of bending bars are opposed. With such an arrangement, it is possible to obtain a higher driving force. As a result, each piezoelectric element can be miniaturized. Further, stress produced between the piezoelectric elements and the first elastic connecting portions can be reduced to improve the durability of the actuator.

The pair of piezoelectric elements may be arranged symmetrically with respect to the pivotal axis of the drive mass portion. With such an arrangement, voltages having the same waveform can be applied to the pair of piezoelectric elements by the same power source so as to drive the actuator. Accordingly, it is possible to reduce cost of the actuator.

Each of the pair of drive mechanisms may configured to maintain a relationship of A<B where A represents an interval between the first connecting portion of a first of the pair of bending bars and the first connecting portion of a second of the pair of bending bars, and B represents an interval between the second connecting portion of the first of the pair of bending bars and the second connecting portion of the second of the pair of bending bars. In this case, the actuator can be driven with a larger deflection angle at a higher frequency.

Each of the pair of drive mechanisms may be configured to maintain a relationship of $0 \leqq A<0.8$ L where A represents an interval between the first connecting portion of a first of the pair of bending bars and the first connecting portion of a second of the pair of bending bars, and L represents a maximum length of the drive mass portion in a direction perpendicular to the pivotal axis of the drive mass portion. In this case, the actuator can be driven with a larger deflection angle by a lower voltage. Further, the drive mass portions can be pivoted with an excellent responsiveness to torsional deformation of the entire first elastic connecting portions.

Each of the pair of drive mechanisms may be configured to maintain a relationship of 0.2 L<B<1.2 L where B represents an interval between the second connecting portion of a first of the pair of bending bars and the second connecting portion of a second of the pair of bending bars, and L represents a maximum length of the drive mass portion in a direction perpendicular to the pivotal axis. In this case, the actuator can be driven at a higher frequency.

Each of the pair of drive mechanisms may be configured to maintain a relationship of A<C where A represents an interval between the first connecting portion of a first of the pair of bending bars and the first connecting portion of a second of the pair of bending bars, and C represents a length of the bending bar. In this case, the actuator can be driven with a larger deflection angle.

The actuator may further include a power source configured to apply an alternating voltage to the piezoelectric elements. The alternating voltage has a frequency substantially equal to a lower frequency of resonance frequencies for a two-degree-of-freedom vibration system at which the drive mass portions and the movable mass portion produce resonance. In this case, a rotational angle (deflection angle) of the movable mass portion can be increased while deflection angles of the drive mass portions are reduced.

Each of the pair of drive mechanisms may be configured to maintain a relationship of $D_d<D_m$ where $D_d$ represents a maximum length of the drive mass portion from the pivotal axis in a direction perpendicular to the pivotal axis, and $D_m$ represents a maximum length of the movable mass portion from the pivotal axis in a direction perpendicular to the pivotal axis. In this case, the actuator can be driven readily and reliably by a low voltage, and a deflection angle (amplitude) of the movable mass portion can be increased.

The drive mass portions in the pair of drive mechanisms may have substantially the same maximum length $D_d$. In this case, the actuator can be driven readily and reliably by a low voltage, and a deflection angle (amplitude) of the movable mass portion can be increased.

Each of the pair of drive mechanisms may be configured to maintain a relationship of $k_1>k_2$ where $k_1$ represents a spring constant of the first elastic connecting portion, and $k_2$ represents a spring constant of the second elastic connecting portion. In this case, the actuator can be driven with a large deflection angle (amplitude) at a high frequency by a low voltage. Further, a rotational angle (deflection angle) of the movable mass portion can be increased while amplitudes of the drive mass portions are reduced.

Each of the pair of drive mechanisms may be configured to maintain a relationship of $J_1 \leqq J_2$ where $J_1$ represents a moment of inertia of the drive mass portion, and $J_2$ represents a moment of inertia of the movable mass portion. In this case, a rotational angle (deflection angle) of the movable mass portion can be increased while deflection angles (amplitudes) of the drive mass portions are reduced.

The actuator may further include a light reflection portion formed on the movable mass portion. With the light reflection portion, the actuator can be applied to various optical devices such as an optical scanner, an optical attenuator, and an optical switch.

The above and other objects, features, and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

Figure 1:
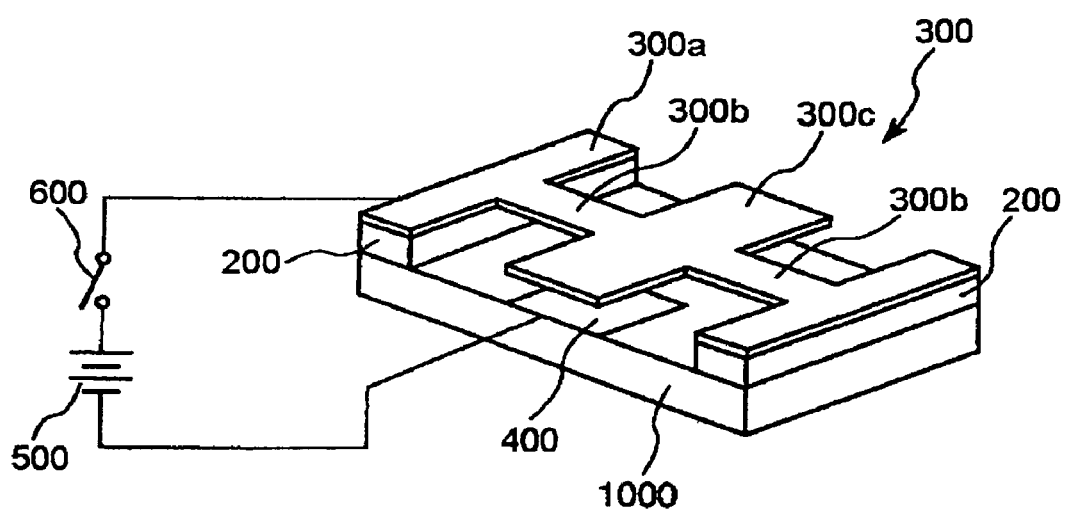
FIG. 1 is a perspective view showing a conventional actuator.

An actuator according to embodiments of the present invention will be described below with reference to FIGS. 2 through 10. Like or corresponding parts are denoted by like or corresponding reference numerals throughout drawings, and will not be described below repetitively.

Figure 2:
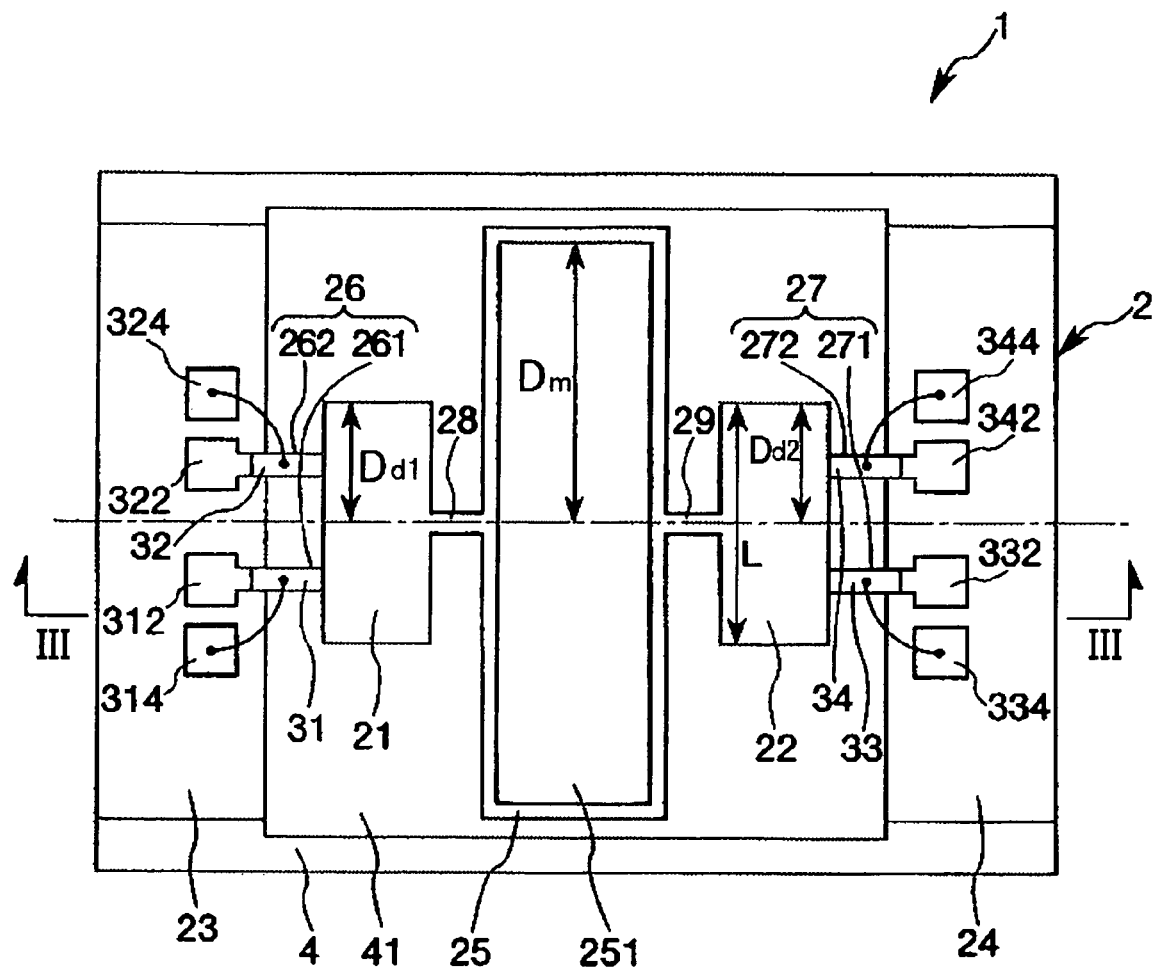
FIG. 2 is a plan view showing an actuator according to a first embodiment of the present invention.
Figure 3:
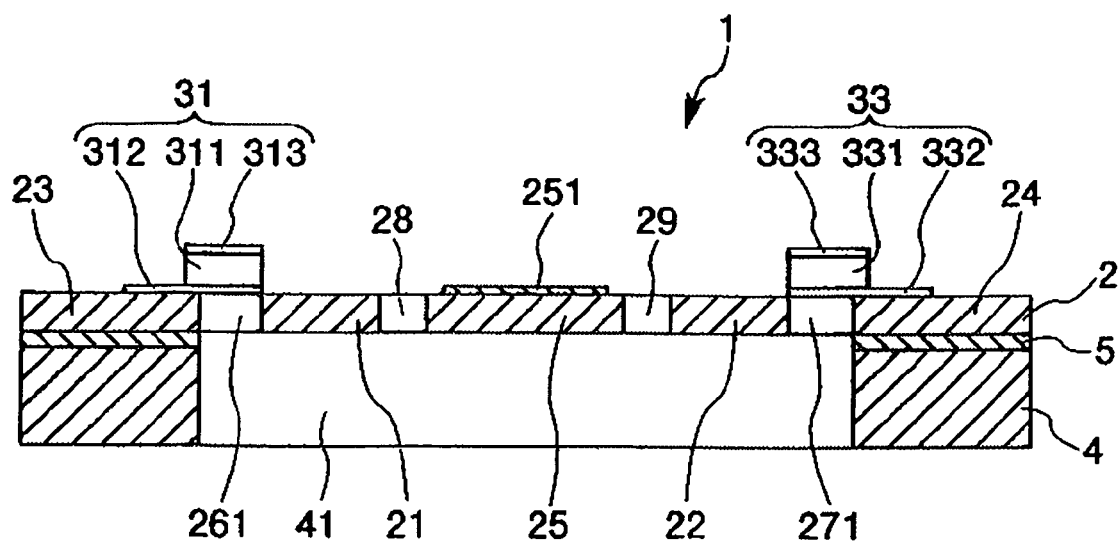
FIG. 3 is a cross-sectional view taken along line III-III of FIG. 2.

FIG. 2 is a plan view showing an actuator 1 according to a first embodiment of the present invention, and FIG. 3 is a cross-sectional view taken along line III-III of FIG. 2. In the following description, near, far, right, and left sides in FIG. 2 will be referred to as "upper," "lower," "right," and "left," respectively. Upper, lower, right, and left sides in FIG. 3 will be referred to as "upper," "lower," "right," and "left," respectively.

As shown in FIGS. 2 and 3, the actuator 1 includes a base member 2 having a two-degree-of-freedom vibration system, piezoelectric elements 31, 32, 33, and 34 for driving the two-degree-of-freedom vibration system of the base member 2, a bonding layer 5, and a support substrate 4 for supporting the base member 2 via the bonding layer 5. The base member 2, the support substrate 4, and the bonding layer 5 may be formed integrally with each other. Each of the piezoelectric elements 31, 32, 33, and 34 is connected to a power source (not shown) so that an alternating voltage (driving voltage) can be applied between electrodes in each of the piezoelectric elements 31, 32, 33, and 34.

The base member 2 includes a pair of drive mass portions (first mass portions) 21 and 22, a pair of support portions 23 and 24, a movable mass portion (second mass portion) 25, a pair of first elastic connecting portions 26 and 27, and a pair of second elastic connecting portions 28 and 29. As shown in FIG. 2, the base member 2 has a bilaterally symmetrical arrangement. Specifically, the movable mass portion 25 is disposed at a central portion of the base member 2. The second elastic connecting portion 28, the drive mass portion 21, the first elastic connecting portion 26, and the support portion 23 are disposed on the left side of the movable mass portion 25. These portions form a drive mechanism for driving the movable mass portion 25. The second elastic connecting portion 29, the drive mass portion 22, the first elastic connecting portion 27, and the support portion 24 are disposed on the right side of the movable mass portion 25. These portions form a drive mechanism for driving the movable mass portion 25. Thus, a pair of drive mechanisms are disposed on both sides of the movable mass portion 25.

Each of the drive mass portions 21 and 22 is in the form of a plate. The drive mass portions 21 and 22 have substantially the same dimension and shape. The movable mass portion 25 is located between the drive mass portions 21 and 22. The drive mass portions 21 and 22 are arranged substantially in a bilaterally symmetrical manner with respect to the movable mass portion 25. The movable mass portion 25 is in the form of a plate and has a light reflection portion 251 formed on a surface thereof. With the light reflection portion 251, the actuator 1 can be applied to various optical devices such as an optical scanner, an optical attenuator, and an optical switch. The drive mass portions 21 and 22 are connected via the first elastic connecting portions 26 and 27 to the support portions 23 and 24, respectively. The movable mass portion 25 is connected via the second elastic connecting portions 28 and 29 to the drive mass portions 21 and 22, respectively.

The first elastic connecting portion 26 interconnects the drive mass portion 21 and the support portion 23 so as to allow the drive mass portion 21 to be pivoted about a pivotal axis with respect to the support portion 23. Similarly, the first elastic connecting portion 27 interconnects the drive mass portion 22 and the support portion 24 so as to allow the drive mass portion 22 to be pivoted about a pivotal axis with respect to the support portion 24. The first elastic connecting portion 26 includes two bending bars 261 and 262 opposed to each other with the pivotal axis of the drive mass portion 21 being interposed therebetween. Similarly, the first elastic connecting portion 27 includes two bending bars 271 and 272 opposed to each other with interposing the pivotal axis of the drive mass portion 22 therebetween.

The second elastic connecting portion 28 interconnects the movable mass portion 25 and the drive mass portion 21 so as to allow the movable mass portion 25 to be pivoted about a pivotal axis with respect to the drive mass portion 21. Similarly, the second elastic connecting portion 29 interconnects the movable mass portion 25 and the drive mass portion 22 so as to allow the movable mass portion 25 to be pivoted about a pivotal axis with respect to the drive mass portion 22.

The first elastic connecting portions 26, 27, the second elastic connecting portions 28, and 29 are coaxially provided in the actuator 1. The drive mass portions 21 and 22 can be pivoted with respect to the support portions 23 and 24 while the first elastic connecting portions 26 and 27 serve as pivotal axes (rotational axes). The movable mass portion 25 can be pivoted with respect to the drive mass portions 21 and 22 while the second elastic connecting portions 28 and 29 serve as pivotal axes (rotational axes).

Thus, the base member 2 has a first vibration system, which is formed by the drive mass portions 21, 22, the first elastic connecting portions 26, and 27, and a second vibration system, which is formed by the movable mass portion 25 and the second elastic connecting portions 28 and 29. Specifically, the base member 2 has a two-degree-of-freedom vibration system including the first vibration system and the second vibration system. More specifically, the second elastic connecting portions 28 and 29 are provided on opposite sides of the movable mass portion 25. The drive mass portion 21 and the first elastic connecting portion 26 are provided so as to correspond to the second elastic connecting portion 28. The drive mass portion 22 and the first elastic connecting portion 27 are provided so as to correspond to the second elastic connecting portion 29. With such an arrangement, the drive mass portions 21, 22, and the movable mass portion 25 can be driven smoothly.

For example, the base member 2, which has the aforementioned two-degree-of-freedom vibration system, is mainly made of silicon. The drive mass portions 21, 22, the movable mass portion 25, the support portions 23, 24, the first elastic connecting portions 26, 27, the second elastic connecting portions 28, and 29 are formed integrally with each other.

The piezoelectric elements 31, 32, 33, and 34 are provided on the corresponding bending bars 261, 262, 271, and 272 of the first elastic connecting portions 26 and 27 to drive the two-degree-of-freedom vibration system. The piezoelectric element 31 is joined to an upper surface of the bending bar 261 and configured to expand and contract in a longitudinal direction of the bending bar 261. Thus, the piezoelectric element 31 bends the bending bar 261 in a vertical direction due to its expansion or contraction. In other words, the piezoelectric element 31 extends along the longitudinal direction of the bending bar 261 and bends the bending bar 261 when the piezoelectric element 31 expands or contracts in the longitudinal direction of the bending bar 261. Thus, the bending bar 261 can be bent reliably with a relatively simple structure by the piezoelectric element 31.

Similarly, the piezoelectric element 32 is joined to an upper surface of the bending bar 262 and configured to expand and contract in a longitudinal direction of the bending bar 262. Thus, the piezoelectric element 32 bends the bending bar 262 in a vertical direction due to its expansion or contraction. The piezoelectric element 32 extends along the longitudinal direction of the bending bar 262 and bends the bending bar 262 when the piezoelectric element 32 expands or contracts in the longitudinal direction of the bending bar 262. Thus, the bending bar 262 can be bent reliably with a relatively simple structure by the piezoelectric element 32.

More specifically, as shown in FIG. 3, the piezoelectric element 31 includes a piezoelectric layer 311 mainly made of a piezoelectric material and a pair of electrodes 312 and 313 holding the piezoelectric layer 311 therebetween. In FIG. 3, the lower electrode 312 is joined onto the upper surface of the bending bar 261. The piezoelectric element 31 thus constructed can bend the bending bar 261 reliably with a relatively simple structure.

The piezoelectric layer 311 is formed so as to cover the entire upper surface of the bending bar 261 and extend over a connecting portion between the bending bar 261 and the support portion 23. With this configuration, it is possible to transmit a driving force of the piezoelectric element 31 efficiently to the bending bar 261. As a result, it is possible to reduce a driving voltage and bend the bending bar 261 more widely.

Examples of the aforementioned piezoelectric material include various kinds of materials such as zinc oxide, aluminum nitride, lithium tantalite, lithium niobate, potassium niobate, lead zirconate titanate (PZT), and barium titanate. One or more of these materials may be combined with each other. It is desirable that the piezoelectric material mainly contains at least one of zinc oxide, aluminum nitride, lithium tantalite, lithium niobate, potassium niobate, and lead zirconate titanate (PZT). The piezoelectric layer made of such a material can drive the actuator 1 at a high frequency.

The electrode 312 has a length larger than the piezoelectric layer 311. Thus, the electrode 312 can be connected to a power source (not shown) on the support portion 23. The electrode 313 has substantially the same length as the piezoelectric layer 311. The electrode 313 is connected via an interconnection, which is formed by wire bonding, to a terminal 314 (see FIG. 2) provided on the support portion 23. Thus, the electrode 313 can be connected to the power source (not shown).

With the piezoelectric element 31 thus constructed, when a voltage is applied between the electrode 312 and the electrode 313 (terminal 314), the piezoelectric layer 311 expands or contracts in parallel to the longitudinal direction of the bending bar 261 due to piezoelectric effect. With expansion or contraction of the piezoelectric layer 311, the piezoelectric element 31 bends the bending bar 261 in the vertical direction. The piezoelectric element 32 has the same structure as the piezoelectric element 31. When a voltage is applied between an electrode 322 and a terminal 324, a piezoelectric layer (not shown) of the piezoelectric element 32 expands or contracts in parallel to the longitudinal direction of the bending bar 262 due to piezoelectric effect. With expansion or contraction of the piezoelectric layer, the piezoelectric element 32 bends the bending bar 262 in the vertical direction. Since the piezoelectric elements 31 and 32 are provided on the upper surface of the base member 2, the piezoelectric elements 31 and 32 mainly cause bending deformation to the two bending bars 261 and 262 in opposite directions when they are driven so as to alternately perform expansion and contraction. In other words, assuming that the first elastic connecting portion 26 including the two bending bars 261 and 262 is formed by one member, the entire first elastic connecting portion 26 can be considered to be subject to torsional deformation.

The piezoelectric elements 33 and 34 have the same arrangement as the piezoelectric elements 31 and 32 described above. Specifically, when a voltage is applied between an electrode 332 and an electrode 333 (terminal 334), a piezoelectric layer 331 of the piezoelectric element 33 expands or contracts in parallel to a longitudinal direction of the bending bar 271 due to piezoelectric effect. With expansion or contraction of the piezoelectric layer 331, the piezoelectric element 33 bends the bending bar 271 in the vertical direction. When a voltage is applied between an electrode 342 and a terminal 344, a piezoelectric layer (not shown) of the piezoelectric element 34 expands or contracts in parallel to the longitudinal direction of the bending bar 272 due to piezoelectric effect. With expansion or contraction of the piezoelectric layer, the piezoelectric element 34 bends the bending bar 272 in the vertical direction. Since the piezoelectric elements 33 and 34 are provided on the upper surface of the base member 2 as with the piezoelectric elements 31 and 32, the piezoelectric elements 33 and 34 mainly cause bending deformation to the two bending bars 271 and 272 in opposite directions when they are driven so as to alternately perform expansion and contraction. In other words, assuming that the first elastic connecting portion 27 including the two bending bars 271 and 272 is formed by one member, the entire first elastic connecting portion 27 can be considered to be subject to torsional deformation.

As shown in FIG. 3, the support substrate 4 for supporting the aforementioned base member 2 is bonded to the base member 2 via the bonding layer 5. For example, the bonding layer 5 is mainly made of glass, silicon, or $SiO_2$, and the support substrate 4 is mainly made of glass or silicon. As shown in FIGS. 2 and 3, the support substrate 4 has an opening portion 41 formed in an upper surface of the support substrate 4 at a position corresponding to the movable mass portion 25. The opening portion 41 forms a relief portion to prevent the movable mass portion 25 from being brought into contact with the support substrate 4 when the movable mass portion 25 is pivoted (vibrated). With the opening portion (relief portion) 41, it is possible to prevent the entire actuator 1 from being enlarged in size and to increase a deflection angle (amplitude) of the movable mass portion 25. If the relief portion has an arrangement that can achieve the above effects, the relief portion may not be opened on a lower surface of the support substrate 4, which is opposite to the movable mass portion 25. Specifically, the relief portion may be formed by a recess formed in the upper surface of the support substrate 4.

The actuator 1 having the above arrangement is operated as follows.

Figure 4:
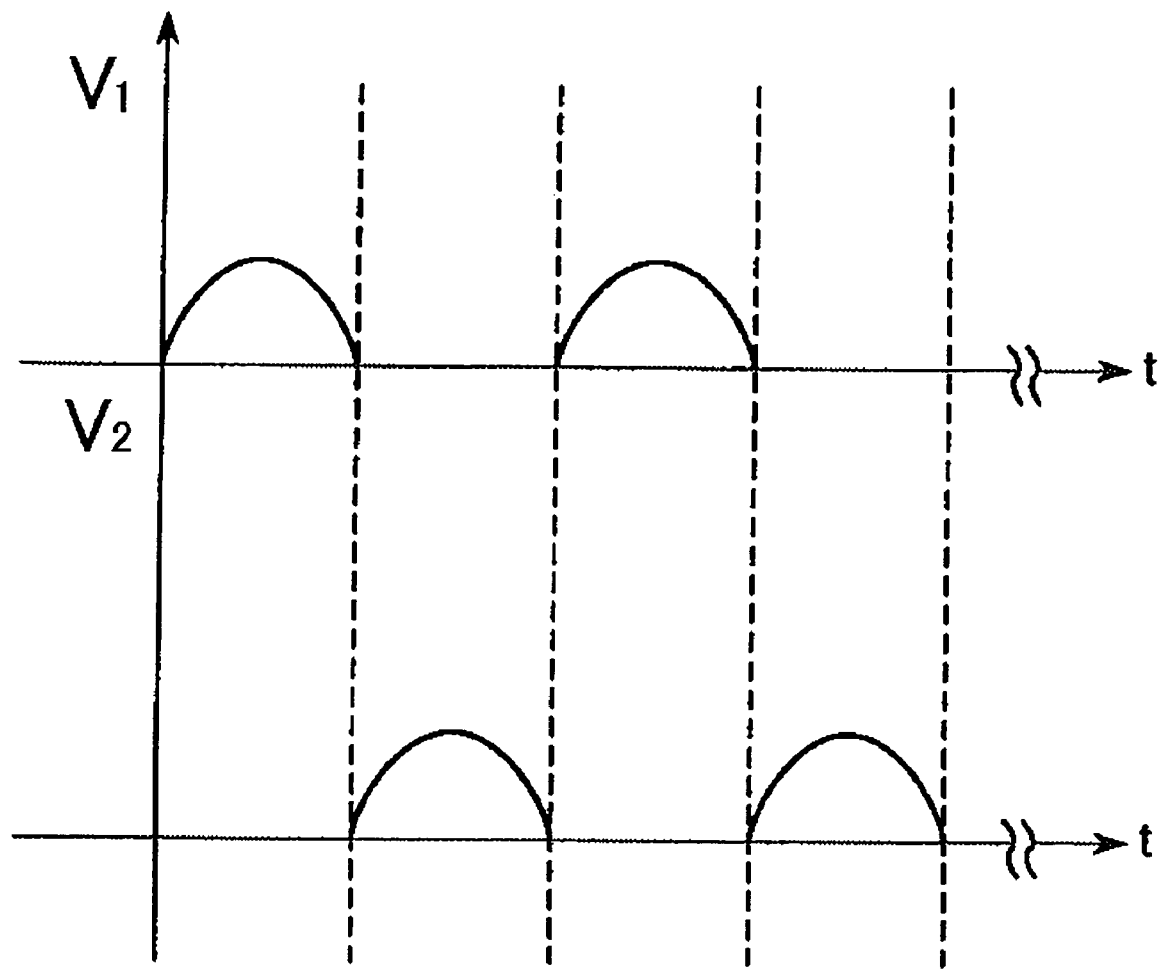
FIG. 4 is a graph showing an example of alternating voltages to be applied to the actuator shown in FIG. 2.

For example, a voltage $V_1$ shown in FIG. 4 is applied to the piezoelectric elements 32 and 34, and a voltage $V_2$ shown in FIG. 4 is applied to the piezoelectric elements 31 and 33. Specifically, voltages having phases shifted by 180° are applied to the piezoelectric elements 32 and 34 and to the piezoelectric elements 31 and 33, respectively. More specifically, voltages are applied to the piezoelectric elements 31, 32, 33, and 34 so as to alternately repeat a state in which the piezoelectric elements 31 and 33 expand while the piezoelectric elements 32 and 34 contract and a state in which the piezoelectric elements 31 and 33 contract while the piezoelectric elements 32 and 34 expand. As a result, torsional deformation is caused to the first elastic connecting portions 26 and 27 so as to pivot (vibrate) the drive mass portions 21 and 22 with respect to the support portions 23 and 24, respectively.

At that time, the bending bars 261, 262, 271, and 272 are subjected mainly to bending deformation so as to cause torsional deformation of the entire first elastic connecting portion 26 and the entire first elastic connecting portion 27. Accordingly, stresses produced in the first elastic connecting portions 26 and 27 can be reduced so as to drive the drive mass portions 21 and 22 with a large deflection angle.

Thus, the actuator 1 obtains a driving force from the piezoelectric elements 31, 32, 33, and 34. Accordingly, the actuator 1 can be driven with a relatively large driving force even in a case of low-voltage driving. Therefore, spring constants of the first elastic connecting portions 26 and 27 can be increased so as to drive the actuator 1 at a high frequency even in the case of low-voltage driving. Particularly, since a driving force of the piezoelectric elements 31, 32, 33, and 34 is relatively high, a deflection angle of the movable mass portion 25 can be increased even if each of the first elastic connecting portions 26 and 27 has a relatively high spring constant.

Then, the movable mass portion 25, which is connected to the second elastic connecting portions 28 and 29, is also inclined and vibrated (pivoted) about the second elastic connecting portions 28 and 29, respectively, with respect to the surface of the support substrate 4 (paper surface of FIG. 2) according to vibration (driving) of the drive mass portions 21 and 22.

In FIG. 2, $D_{d1}$ represents a (maximum) length of the drive mass portion 21 from the pivotal axis to its edge in a direction (longitudinal direction of the drive mass portion 21) perpendicular to the pivotal axis, $D_{d2}$ represents a (maximum) length of the drive mass portion 22 from the pivotal axis to its edge in a direction (longitudinal direction of the drive mass portion 22) perpendicular to the pivotal axis, and $D_m$ represents a (maximum) length from the pivotal axis of the movable mass portion 25 to an edge of the movable mass portion 25 in a direction (longitudinal direction of the movable mass portion 25) perpendicular to the pivotal axis. In the present embodiment, since the drive mass portions 21 and 22 are independently provided, the movable mass portion 25 and the drive mass portions 21 and 22 do not interfere with each other, irrespective of the size of the movable mass portion 25 (length $D_m$). Accordingly, it is possible to reduce the lengths $D_{d1}$ and $D_{d2}$ and hence to increase rotational angles (deflection angles) of the drive mass portions 21 and 22. As a result, it is possible to increase a rotational angle of the movable mass portion 25.

It is desirable that the movable mass portion 25 and the drive mass portions 21 and 22 are designed so as to meet $D_{d1}<D_m$ and $D_{d2}<D_m$. In such a case, lengths $D_{d1}$ and $D_{d2}$ can further be reduced. Accordingly, it is possible to further increase rotational angles of the drive mass portions 21 and 22 and hence a rotational angle of the movable mass portion 25. Further, it is desirable that a maximum rotational angle of the movable mass portion 25 is at least 20°.

With the above arrangement, it is possible to achieve low-voltage driving of the drive mass portions 21 and 22 and vibration (pivotal movement) of the movable mass portion 25 with a large rotational angle. Thus, when the actuator 1 is applied to an optical scanner used in optical devices such as a laser printer and a scanning confocal laser microscope, the optical devices can readily be made compact in size.

In the illustrated embodiment, the lengths $D_{d1}$ and $D_{d2}$ are set to be substantially the same. However, the lengths $D_{d1}$ and $D_{d2}$ may have different values.

Figure 5:
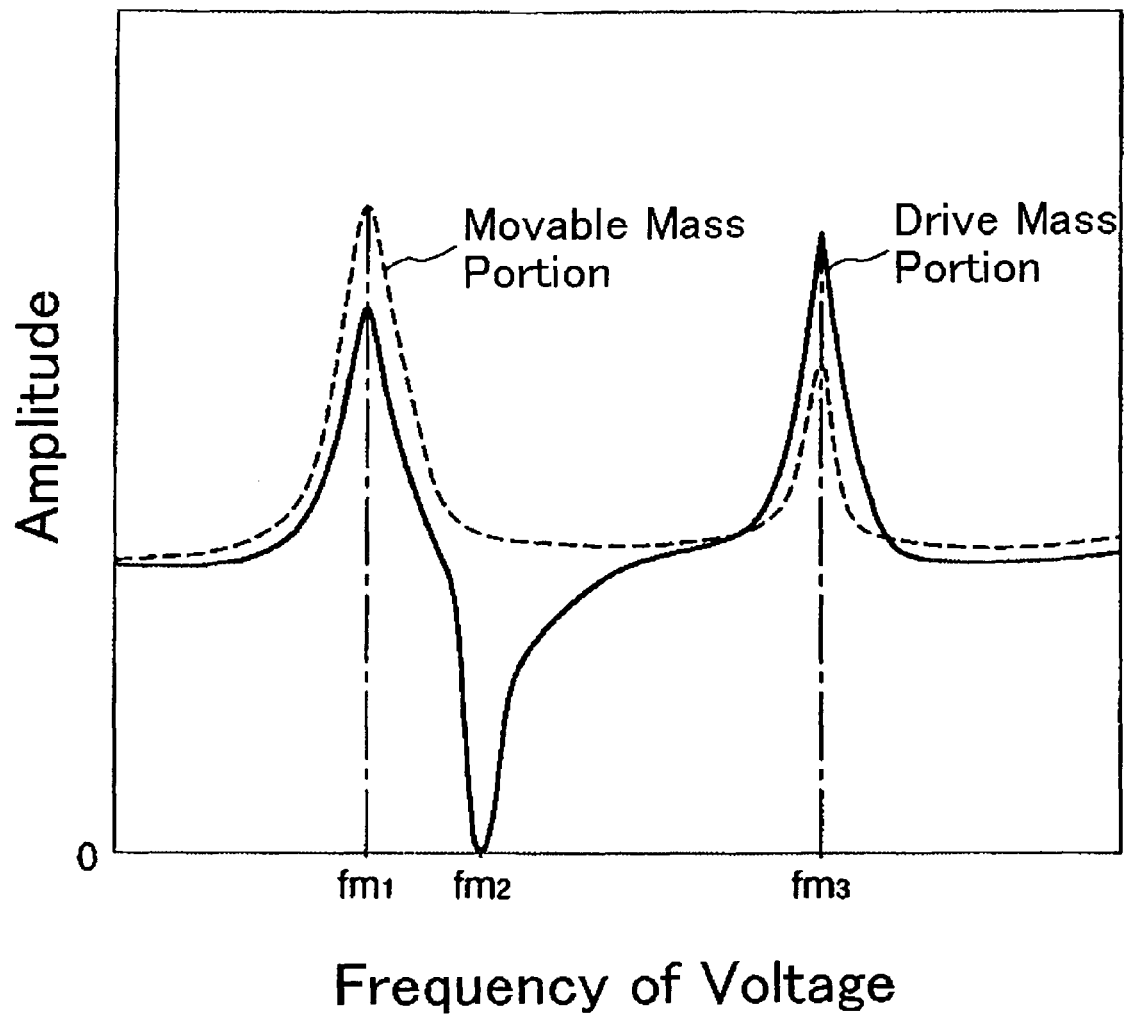
FIG. 5 is a graph showing resonance curves which represent amplitudes of the drive mass portion and the movable mass portion when a frequency of an applied alternating voltage is varied.

Meanwhile, the vibration system (two-degree-of-freedom vibration system) having the mass portions 21, 22, and 25 has frequency characteristics as shown in FIG. 5 between amplitudes (deflection angles) of the drive mass portions 21, 22, and the movable mass portion 25 and frequencies of alternating voltages applied to the piezoelectric elements 31, 32, 33, and 34. As shown in FIG. 5, the vibration system has two resonance frequencies $fm_1$ [kHz] and $fm_3$ [kHz] ($fm_1<fm_3$) at which amplitudes of the drive mass portions 21 and 22 and amplitudes of the movable mass portion 25 become large. The vibration system also has an antiresonant frequency $fm_2$ [kHz] at which amplitudes of the drive mass portions 21 and 22 substantially become zero.

In the vibration system, it is desirable to set a frequency F of alternating voltages applied to the piezoelectric elements 31, 32, 33, and 34 to be substantially equal to the lower frequency $fm_1$ of the two resonance frequencies. In such a case, a deflection angle (rotational angle) of the movable mass portion 25 can be increased while amplitudes of the drive mass portions 21 and 22 are reduced. When the frequency F [kHz] and the resonance frequency $fm_1$ [kHz] meet conditions of $(fm1-1) \leq F \leq (fm1+1)$, the frequency F is considered to be substantially equal to the resonance frequency $fm_1$.

Each of the drive mass portions 21 and 22 may have an average thickness of 1 to 1,500 μm, preferably 10 to 300 μm. The movable mass portion 25 may have an average thickness of 1 to 1,500 μm, preferably 10 to 300 μm. Each of the first elastic connecting portions 26 and 27 may have a spring constant $k_1$ of $1\times10^{-3}$ to $1\times10^5$ Nm/rad, preferably $1\times10^{-2}$ to $1\times10^4$ Nm/rad, more preferably $1\times10^{-1}$ to $1\times10^3$ Nm/rad. When the first elastic connecting portions 26 and 27 have a spring constant in these ranges, it is possible to further increase a rotational angle (deflection angle) of the movable mass portion 25. Each of the second elastic connecting portions 28 and 29 may have a spring constant $k_2$ of $1\times10^{-4}$ to $1\times10^4$ Nm/rad, preferably $1\times10^{-2}$ to $1\times10^3$ Nm/rad, more preferably $1\times10^{-1}$ to $1\times10^2$ Nm/rad. When the second elastic connecting portions 28 and 29 have a spring constant in these ranges, a deflection angle (rotational angle) of the movable mass portion 25 can be increased while deflection angles of the drive mass portions 21 and 22 are reduced. Further, it is desirable that the spring constant $k_1$ of each of the first elastic connecting portions 26 and 27 is larger than the spring constant $k_2$ of each of the second elastic connecting portions 28 and 29 ($k_1>k_2$). In such a case, a rotational angle (deflection angle) of the movable mass portion 25 can be increased while deflection angles of the drive mass portions 21 and 22 are reduced.

Furthermore, it is desirable that a relationship of $J_1 \leq J_2$ is maintained between a moment $J_1$ of inertia of each of the drive mass portions 21 and 22 and a moment $J_2$ of inertia of the movable mass portion 25. More preferably, a relationship of $J_1 \leq J_2$ should be maintained. In such a case, a rotational angle (deflection angle) of the movable mass portion 25 can be increased while deflection angles of the drive mass portions 21 and 22 are reduced.

Meanwhile, the first vibration system, which includes the drive mass portions 21 and 22 and the first elastic connecting portions 26 and 27, has a natural frequency $\omega_1$ defined by $\omega_1 = (k_1/J_1)^{1/2}$ where $J_1$ is a moment of inertia of each of the drive mass portions 21 and 22, and $k_1$ is a spring constant of each of the first elastic connecting portions 26 and 27. The second vibration system, which includes the movable mass portion 25 and the second elastic connecting portions 28 and 29, has a natural frequency $\omega_2$ defined by $\omega_2=(k_2/J_2)^{1/2}$ where $J_2$ is a moment of inertia of the movable mass portion 25, and $k_2$ is a spring constant of each of the second elastic connecting portions 28 and 29. It is desirable that a relationship of $\omega_1 > \omega_2$ is maintained between the natural frequency $\omega_1$ of the first vibration system and the natural frequency $\omega_2$ of the second vibration system. In such a case, a rotational angle (deflection angle) of the movable mass portion 25 can be increased while deflection angles of the drive mass portions 21 and 22 are reduced.

For example, the actuator 1 having the above arrangement can be manufactured as follows. An example of a method of manufacturing the actuator 1 in the first embodiment is shown in FIGS. 6A through 6F. FIGS. 6A through 6F are vertical cross-sectional views corresponding to FIG. 3, which is taken along line III-III of FIG. 2. In the following description, upper and lower sides in FIGS. 6A through 6F will be referred to as "upper" and "lower," respectively.

<Step A1>

Figure 6A:
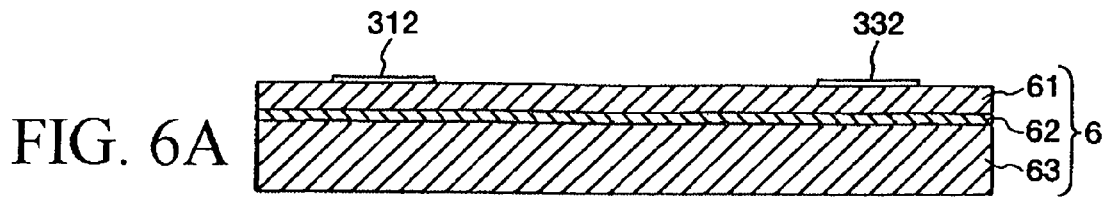
FIGS. 6A through 6F are cross-sectional views explanatory of a method of manufacturing the actuator shown in FIG. 2.

First, as shown in FIG. 6A, an SOI substrate 6 having a laminated structure of a first Si layer 61, an $SiO_2$ layer 62, and a second Si layer 63 is prepared. Then, electrodes 312, 322, 332, and 342 and terminals 314, 324, 334, and 344 are formed on a surface of the SOI substrate 6, i.e., a surface of the first Si layer 61. The electrodes 322 and 342 are not shown in FIGS. 6A through 6F.

For example, the electrodes 312, 322, 332, and 342 and the terminals 314, 324, 334, and 344 can be formed in the following manner. A metal film is formed on the SOI substrate 6. Then, a resist mask is applied onto the metal film at positions corresponding to the electrodes 312, 322, 332, and 342 and the terminals 314, 324, 334, and 344. Thereafter, the metal film is etched in a state such that the resist mask is formed on the metal film at some portions. The resist mask is then removed, and the electrodes 312, 322, 332, and 342 and the terminals 314, 324, 334, and 344 are thus formed on the surface of the SOI substrate 6.

For example, the formation of the metal film may be performed by a chemical deposition process such as a plasma CVD method, a thermal CVD method, and a laser CVD method, a vacuum evaporation process, a sputtering process, a dry plating process such as an ion plating method, a wet plating process such as an electrolytic plating method, an immersion plating method, and an electroless plating method, a thermal spraying process, and a bonding process of a sheet material. These processes can also be employed to form a metal film in other steps described below.

Examples of the etching method include a physical etching method such as a plasma etching method, a reactive ion etching method, a beam etching method, and a photo-assisted etching method, and a chemical etching method such as a wet etching method. One or more of these methods may be combined with each other. These etching methods can also be employed for etching processes in other steps described below.

<Step A2>

Figure 6B:
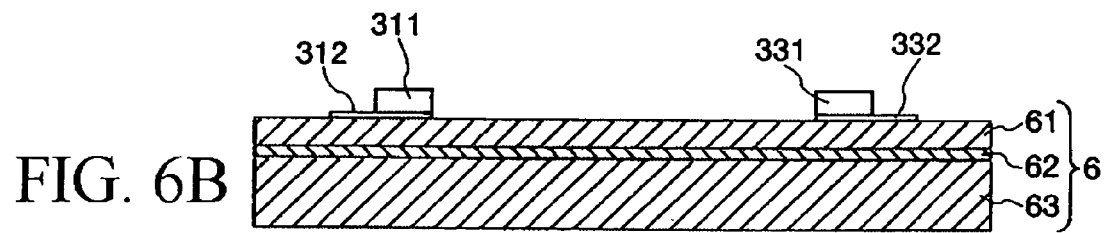

Next, as shown in FIG. 6B, piezoelectric layers 311, 321, 331, and 341 are formed on the corresponding electrodes 312, 322, 332, and 342. The piezoelectric layers 321 and 341 corresponding to the electrodes 322 and 342 are not shown in FIGS. 6B through 6F. The piezoelectric layers 311, 321, 331, and 341 can be formed in the same manner as described in Step A1 for the formation of the electrodes 312, 322, 332, and 342.

<Step A3>

Figure 6C:
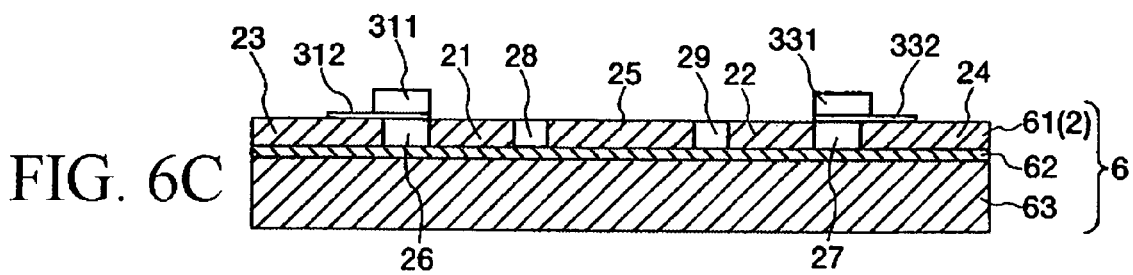

Then, as shown in FIG. 6C, portions of the first Si layer 61 in the SOI substrate 6 are removed so as to form the drive mass portions 21, 22, the support portions 23, 24, the movable mass portion 25, the first elastic connecting portions 26, 27, and the second elastic connecting portions 28, and 29. Thus, the base member 2 can be obtained.

For example, the drive mass portions 21, 22, the support portions 23, 24, the movable mass portion 25, the first elastic connecting portions 26, 27, and the second elastic connecting portions 28, and 29 can be formed in the following manner. A metal film or a silicon oxide film is formed on the SOI substrate 6. Then, a resist mask is applied onto the metal film or the silicon oxide film at positions corresponding to the drive mass portions 21, 22, the support portions 23, 24, the movable mass portion 25, the first elastic connecting portions 26, 27, and the second elastic connecting portions 28, and 29. Thereafter, the metal film or the silicon oxide film is etched in such a state such that the resist mask is formed on the metal film or the silicon oxide film at some portions. Then, the resist mask is removed. While the metal film or the silicon oxide film is used as a mask, a portion of the first Si layer 61 is etched so as to form the drive mass portions 21, 22, the support portions 23, 24, the movable mass portion 25, the first elastic connecting portions 26, 27, and the second elastic connecting portions 28, and 29. At that time, the $SiO_2$ layer 62, which is an intermediate layer of the SOI substrate 6, serves as a stopper layer for the etching process. The same etching methods as described in Step A1 can be employed in Step A3.

<Step A4>

Figure 6D:
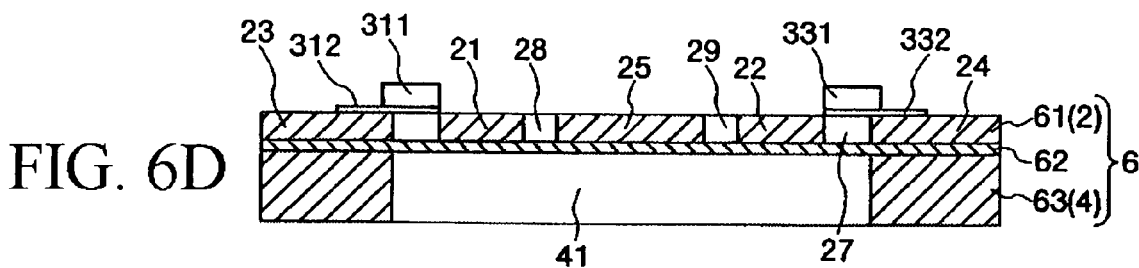

Then, as shown in FIG. 6D, a portion of the second Si layer 63 of the SOI substrate 6 is removed so that a recess (opening portion 41) is formed in the second Si layer 63. The recess can be formed in the same manner as described in Step A3.

<Step A5>

Figure 6E:
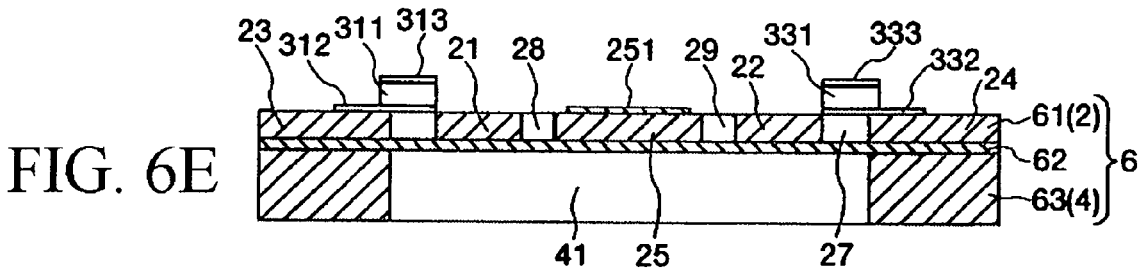

As shown in FIG. 6E, electrodes 313, 323, 333, and 343 are formed on the corresponding piezoelectric layers 311, 321, 331, and 341. The electrodes 323 and 343 corresponding to the piezoelectric layers 322 and 342 are not shown in FIGS. 6E and 6F. Further, a light reflection portion 251 is formed on the movable mass portion 25. The electrodes 313, 323, 333, and 343, and the light reflection portion 251 can be formed in the same manner as described in Step A1.

<Step A6>

Figure 6F:
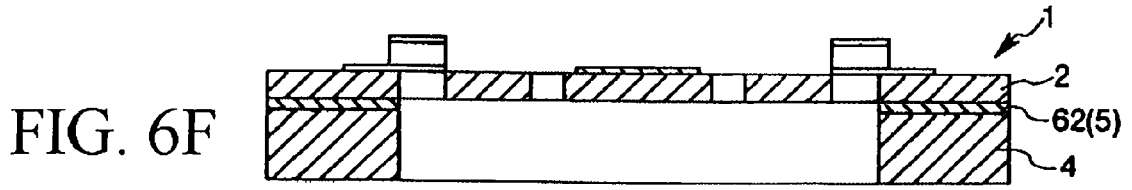

Then, as shown in FIG. 6F, a portion of the $SiO_2$ layer 62 in the SOI substrate 6 is removed, and the bonding layer 5 is thus formed. In this manner, an actuator 1 according to the present embodiment can be obtained.

Figure 7:
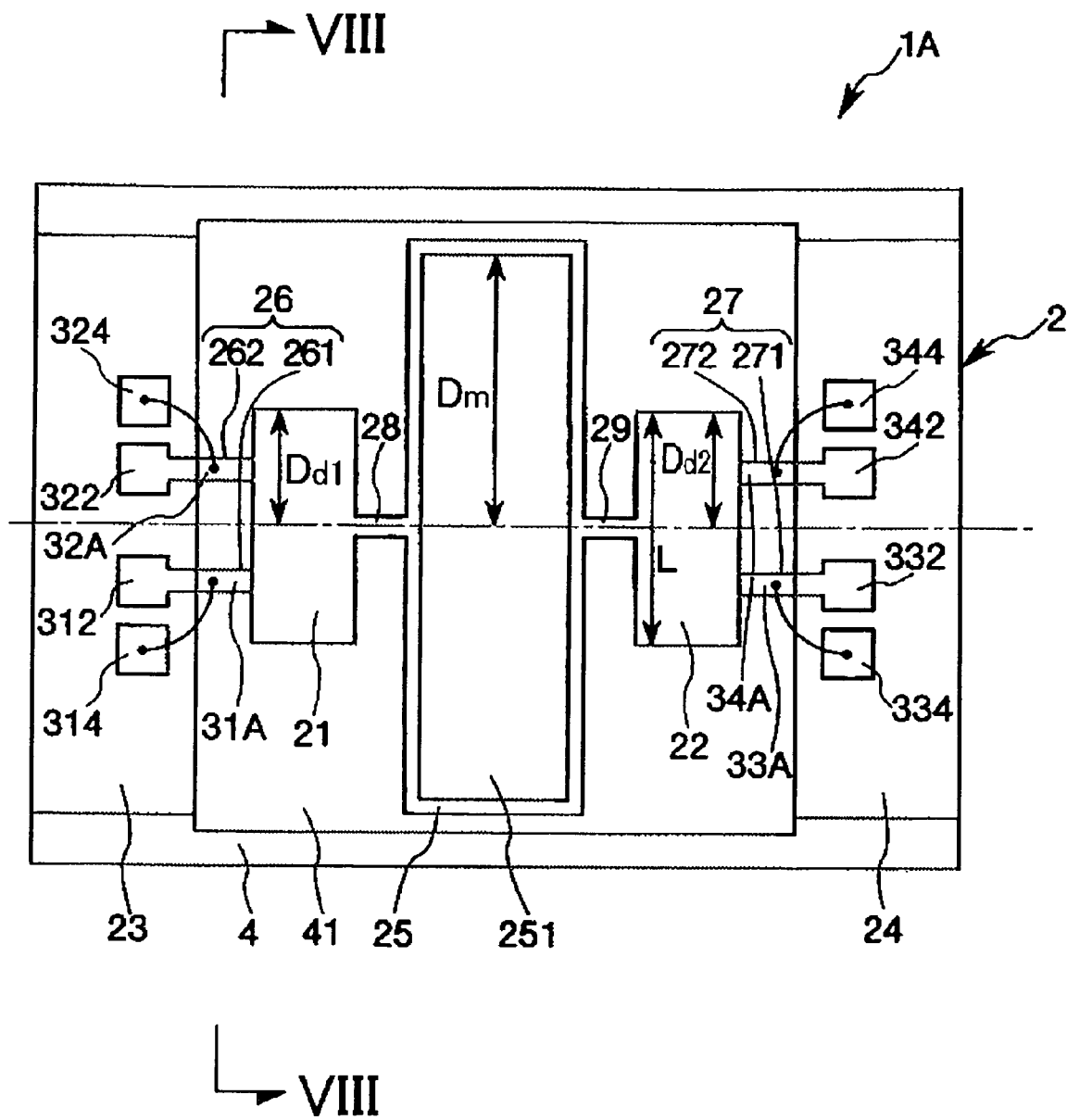
FIG. 7 is a plan view showing an actuator according to a second embodiment of the present invention.
Figure 8:
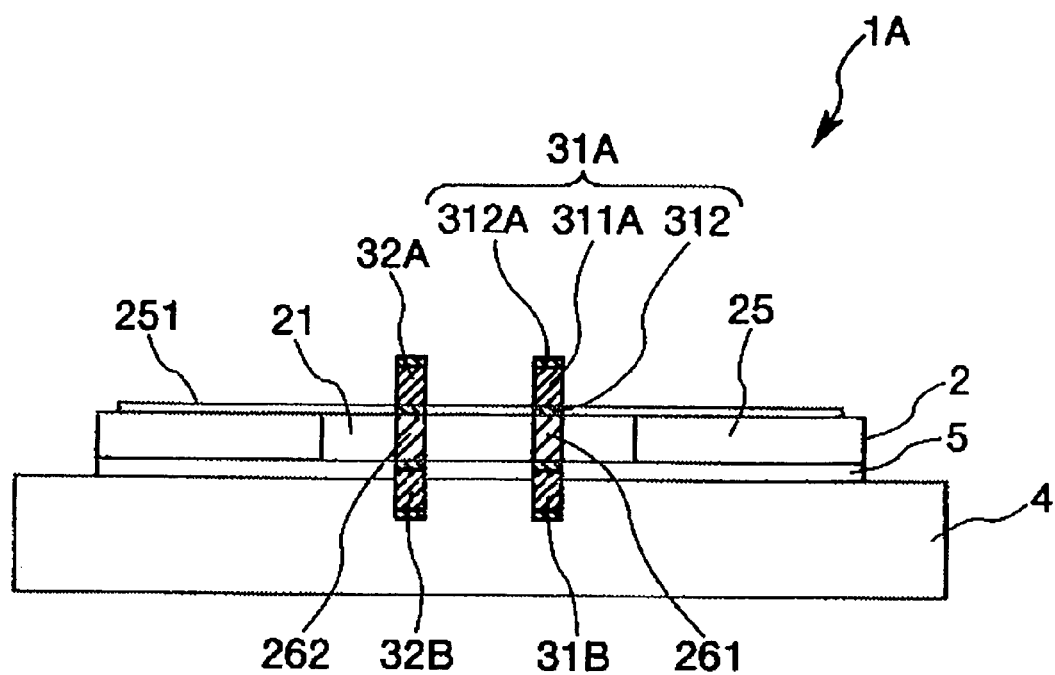
FIG. 8 is a cross-sectional view taken along line VIII-VIII of FIG. 7.

FIG. 7 is a plan view showing an actuator 1A according to a second embodiment of the present invention, and FIG. 8 is a cross-sectional view taken along line VIII-VIII of FIG. 7. In the following description, near, far, right, and left sides in FIG. 7 will be referred to as "upper," "lower," "right," and "left," respectively. Upper, lower, right, and left sides in FIG. 8 will be referred to as "upper," "lower," "right," and "left," respectively. The following description of the actuator 1A in the second embodiment is mainly focused on differences between the actuator 1A in the second embodiment and the actuator 1 in the first embodiment. Similar portions will not be described repetitively.

The actuator 1A in the second embodiment is substantially the same as the actuator 1 in the first embodiment except that it has different structure and arrangement of the piezoelectric elements. Specifically, the actuator 1A shown in FIGS. 7 and 8 has piezoelectric elements provided on both surfaces of the bending bars 261, 262, 271, and 272, respectively. More specifically, the actuator 1A includes a piezoelectric element 31A provided on an upper surface of the bending bar 261 and a piezoelectric element 31B provided on a lower surface of the bending bar 261. The actuator 1A includes a piezoelectric element 32A provided on an upper surface of the bending bar 262 and a piezoelectric element 32B provided on a lower surface of the bending bar 262. Thus, the piezoelectric elements are provided on both surfaces of the bending bar 261 in a direction perpendicular to a longitudinal direction of the bending bar 261 and perpendicular to a direction in which the two bending bars 261 and 262 face with each other. Further, the piezoelectric elements are provided on both surfaces of the bending bar 262 in the direction perpendicular to a longitudinal direction of the bending bar 262 and perpendicular to the direction in which the two bending bars 261 and 262 face with each other. The piezoelectric element 31A includes a piezoelectric layer 311A and a pair of electrodes 312 and 312A interposing the piezoelectric layer 311A therebetween. In the present embodiment, the piezoelectric layer 311A has substantially the same length as the bending bar 261. The upper electrode 312A also has substantially the same length as the bending bar 261. Each of the piezoelectric elements 31B, 32A, and 32B has the same arrangement as the piezoelectric element 31A.

Further, the actuator 1A includes a piezoelectric element 33A provided on an upper surface of the bending bar 271 and a piezoelectric element 33B provided on a lower surface of the bending bar 271. The actuator 1A also includes a piezoelectric element 34A provided on an upper surface of the bending bar 272 and a piezoelectric element 34B provided on a lower surface of the bending bar 272. Each of the piezoelectric elements 33A, 33B, 34A, and 34B has the same arrangement as the piezoelectric element 31A.

Thus, the piezoelectric elements 31A, 31B, 32A, 32B, 33A, 33B, 34A, and 34B are configured to provide the same driving force when the same voltage is applied to these piezoelectric elements. Accordingly, it is possible to simplify an arrangement of a power source to be used and to drive the actuator 1A with high accuracy.

When the actuator 1A is to be driven, for example, a voltage $V_1$ shown in FIG. 4 is applied to the piezoelectric elements 31A, 32B, 33A, and 34B, and a voltage $V_2$ shown in FIG. 4 is applied to the piezoelectric elements 31B, 32A, 33B, and 34A. Specifically, voltages are applied to the piezoelectric elements so as to alternately repeat a state in which the piezoelectric elements 31A, 32B, 33A, and 34B expand while the piezoelectric elements 31B, 32A, 33B, and 34A contract and a state in which the piezoelectric elements 31A, 32B, 33A, and 34B contract while the piezoelectric elements 31B, 32A, 33B, and 34A expand. As a result, torsional deformation is caused to the first elastic connecting portions 26 and 27 so as to pivot (vibrate) the drive mass portions 21 and 22 with respect to the support portions 23 and 24, respectively.

According to the actuator 1A in the present embodiment, since the piezoelectric elements are provided on both surfaces of the first elastic connecting portions, it is possible to obtain a larger driving force in addition to the advantageous effects of the actuator 1 in the first embodiment. As a result, each piezoelectric element can be miniaturized. Further, stress produced between the piezoelectric elements and the first elastic connecting portions can be reduced to improve the durability of an actuator.

Figure 9:
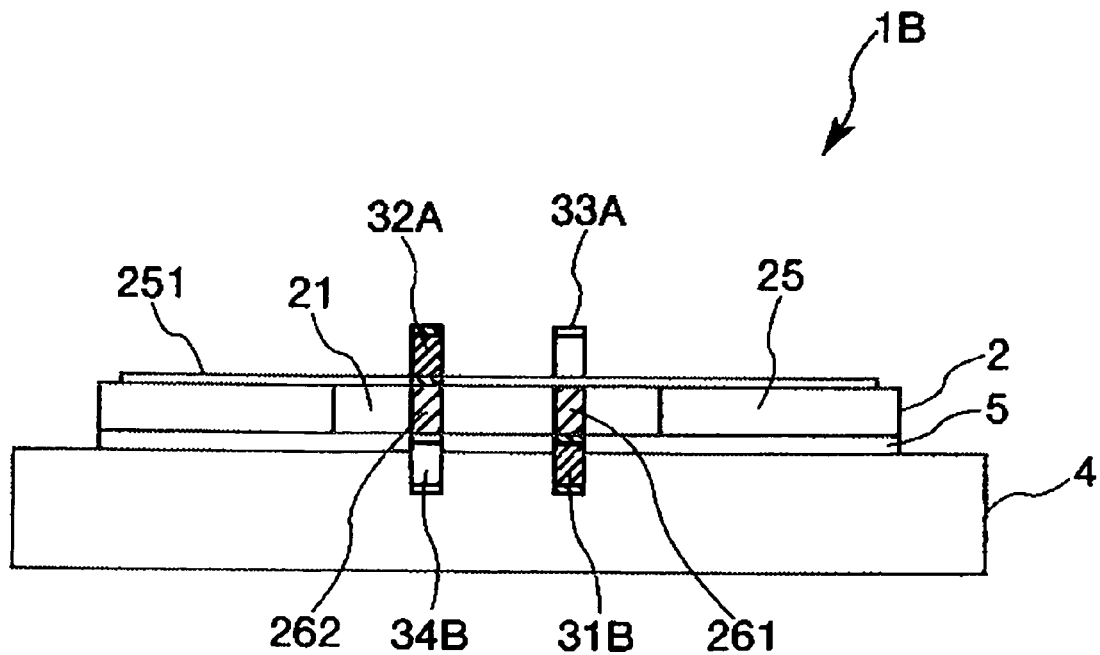
FIG. 9 is a cross-sectional view showing an actuator according to a third embodiment of the present invention.

FIG. 9 is a cross-sectional view showing an actuator 1B according to a third embodiment of the present invention. FIG. 9 corresponds to the cross-sectional view taken along line VIII-VIII of FIG. 7. In the following description, upper, lower, right, and left sides in FIG. 9 will be referred to as "upper," "lower," "right," and "left," respectively. The following description of the actuator 1B in the third embodiment is mainly focused on differences between the actuator 1B in the third embodiment and the actuator 1A in the second embodiment. Similar portions will not be described repetitively.

The actuator 1B in the third embodiment is substantially the same as the actuator 1A in the second embodiment except that four piezoelectric elements are removed. Specifically, the actuator 1B shown in FIG. 9 has a piezoelectric element 31B provided on a lower surface of the bending bar 261, a piezoelectric element 32A provided on an upper surface of the bending bar 262, a piezoelectric element 33A provided on an upper surface of the bending bar 271, and a piezoelectric element 34B provided on a lower surface of the bending bar 272. Thus, the two piezoelectric elements 31B and 32A are provided so as to be symmetrical with respect to a pivotal axis of the drive mass portion 21, and the two piezoelectric elements 33A and 34B are provided so as to be symmetrical with respect to a pivotal axis of the drive mass portion 22. With such an arrangement, voltages having the same waveform can be applied to the piezoelectric elements 31B, 32A, 33A, and 34B by the same power source so as to drive the actuator 1B. Accordingly, it is possible to reduce cost of an actuator.

Figure 10:
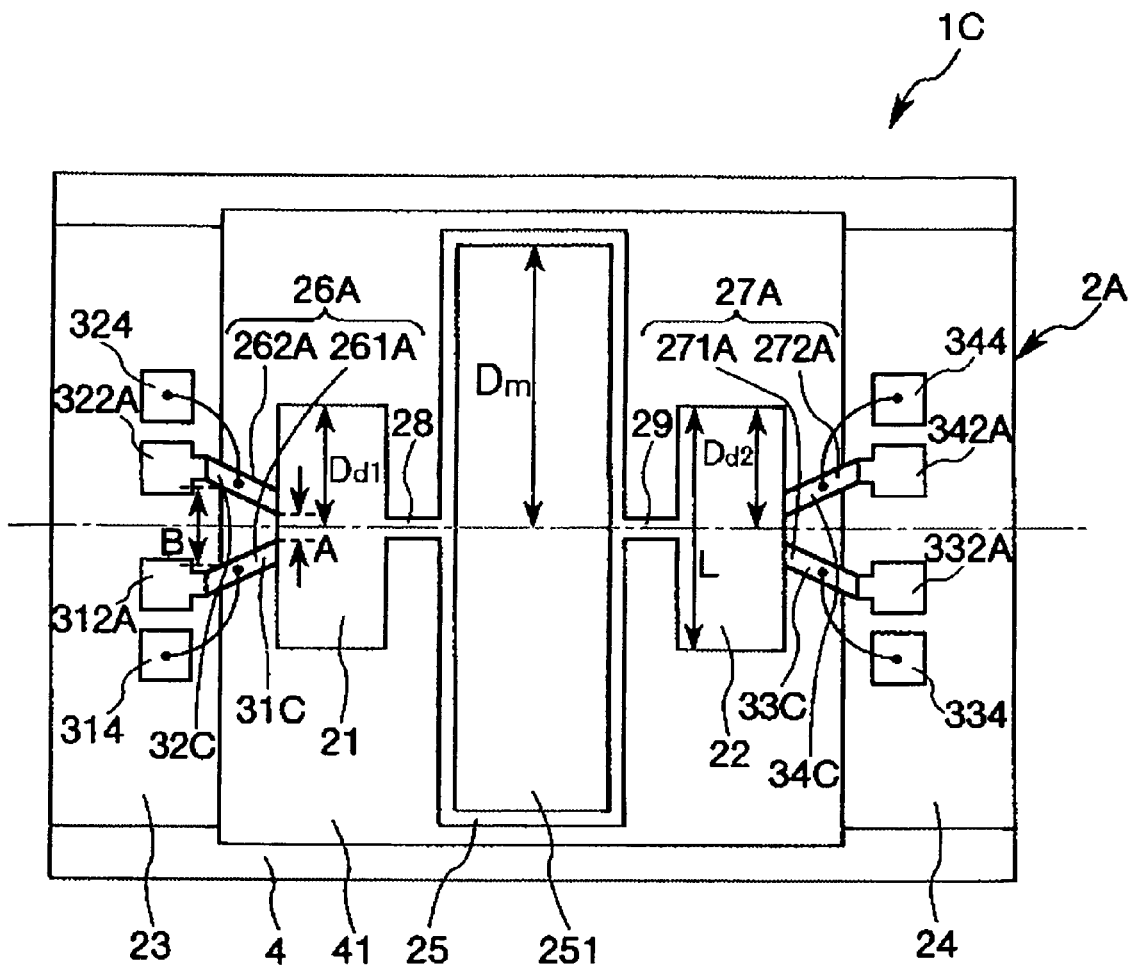
FIG. 10 is a plan view showing an actuator according to a fourth embodiment of the present invention.

FIG. 10 is a plan view showing an actuator 1C according to a fourth embodiment of the present invention. In the following description, near, far, right, and left sides in FIG. 10 will be referred to as "upper," "lower," "right," and "left," respectively. The following description of the actuator 1C in the fourth embodiment is mainly focused on differences between the actuator 1C in the fourth embodiment and the actuator 1 in the first embodiment. Similar portions will not be described repetitively.

The actuator 1C in the fourth embodiment is substantially the same as the actuator 1 in the first embodiment except that the first elastic connecting portions are connected to the drive mass portions at different connecting positions. Specifically, in the actuator 1C shown in FIG. 10, an interval A between a (first) connecting portion between the bending bar 261 and the drive mass portion 21 and a (first) connecting portion between the bending bar 262 and the drive mass portion 21 is smaller than an interval B between a (second) connecting portion between the bending bar 261 and the support portion 23 and a (second) connecting portion between the bending bar 262 and the support portion 23 (A<B). Since the interval A is relatively small, the first connecting portion between the bending bar 261 and the drive mass portion 21 and the first connecting portion between the bending bar 262 and the drive mass portion 21 are close to the pivotal axis of the drive mass portion 21. Accordingly, a large deflection angle can be maintained even in a case of small bending deformation of the bending bars 261 and 262. Further, since the interval B is relatively large, the actuator 1C can be driven at a high frequency while a spring constant of the entire first elastic connecting portion 26 is prevented from being lowered. Accordingly, a deflection angle can further be increased while a high driving frequency is maintained.

When L represents a maximum length of the drive mass portion 21 in a direction perpendicular to the pivotal axis, it is desirable that a relationship of $0 \leq A < 0.8\ L$ is maintained. More preferably, a relationship of $0 \leq A < 0.5\ L$ should be maintained. In such a case, the mass of the drive mass portions 21 suitably acts on the vibration of the first vibration system. Accordingly, a deflection angle can further be increased. Further, when the interval A is small, the drive mass portions 21 and 22 can be pivoted with an excellent responsiveness to torsional deformation of the first elastic connecting portions 26 and 27.

When the interval A is larger than the above upper limit, the mass of the drive mass portions 21 may not suitably act on the vibration of the first vibration system depending on the mass of the drive mass portions 21 or the spring constant of the first elastic connecting portion 26. In such a case, a large deflection angle cannot be obtained. Further, when the interval A is large, the amount of pivotal movement of the drive mass portion 21 is relatively small as compared to the amount of bending deformation of the bending bars 261 and 262.

Further, it is desirable that a relationship of 0.2 L<B<1.2 L is maintained. More preferably, a relationship of 0.3 L<B<L should be maintained. In such a case, the actuator 1C can be driven at a high frequency while a spring constant of the entire first elastic connecting portion 26 is prevented from being lowered. When the interval B is smaller than the above lower limit, a spring constant of the first elastic connecting portion 26 is lowered depending on the shape or material of the first elastic connecting portion 26. Accordingly, it becomes difficult to drive the actuator 1C at a high frequency. On the other hand, when the interval B is larger than the above upper limit, a spring constant of the first elastic connecting portion 26 is excessively increased depending on the shape or material of the first elastic connecting portion 26. Accordingly, a larger driving force is required, resulting in an increased size of the piezoelectric element 31C.

Further, it is desirable that the interval A is smaller than a length of each of the bending bars 261 and 262. With such an arrangement, the actuator 1C can be driven with a larger deflection angle.

The above discussion on the bending bars 261 and 262 and the piezoelectric elements 31C and 32C provided on the bending bars 261 and 262 is applicable to the bending bars 271 and 272 and the piezoelectric elements 33C and 34C provided on the bending bars 271 and 272.

The actuator 1C in the present embodiment can be driven with a larger deflection angle at a higher frequency.

The aforementioned actuators 1, 1A, 1B, and 1C can be applied to various electronic devices. An electronic device having an actuator according to the present invention has a high reliability. For example, the aforementioned actuators 1, 1A, 1B, and 1C are suitably applicable to an optical scanner or an imaging display used in a laser printer, a bar-code reader, a scanning confocal laser microscope, or the like.

Although an actuator according to the present invention has been described based on the illustrated embodiments, the present invention is not limited to those embodiments. For example, each component in the actuators described above may be replaced with any component having the same function. Further, any additional components may be added to the actuators described above.

In the above embodiments, each of the bending bars is illustrated as having a linear shape. However, the bending bars may have any shape as long as they can cause torsional deformation to the entire first elastic connecting portion when bending deformation is mainly caused to two bending bars in opposite directions. For example, the bending bars may be curved.

Further, in the above embodiments, the piezoelectric elements are jointed on the upper surface and/or the lower surface of the bending bars. However, the piezoelectric elements may be arranged in any form as long as the piezoelectric elements can mainly cause bending deformation to the bending bars in opposite directions.

Furthermore, in the above embodiments, the actuator has a (bilaterally) symmetrical structure with respect to a central plane of the actuator that is perpendicular to the pivotal axes of the drive mass portions and the movable mass portion. However, the actuator may have an asymmetrical structure.

Moreover, in the above embodiments, the light reflection portion is provided on the upper surface of the movable mass portion (at an opposite side of the support substrate). However, the light reflection portion may be provided on the lower surface of the movable mass portion or on both surfaces of the movable mass portion.

Although certain preferred embodiments of the present invention have been shown and described in detail, it should be understood that various changes and modifications may be made therein without departing from the scope of the appended claims.

What is claimed is:

1. An actuator comprising:
   a movable mass portion; and
   a pair of drive mechanisms for driving the movable mass portion, each of the pair of drive mechanisms including:
   (i) a drive mass portion,
   (ii) a support portion for supporting the drive mass portion,
   (iii) a first elastic connecting portion interconnecting the drive mass portion and the support portion so as to allow the drive mass portion to be pivoted about a pivotal axis with respect to the support portion, and
   (iv) a second elastic connecting portion interconnecting the drive mass portion and the movable mass portion so as to allow the movable mass portion to be pivoted about the pivotal axis with respect to the drive mass portion, the first elastic connecting portion including:
      (a) a pair of bending bars opposed to each other with the pivotal axis of the drive mass portion interposed therebetween, each of the pair of bending bars having a first connecting portion connected to the drive mass portion and a second connecting portion connected to the support portion, and
      (b) a pair of piezoelectric elements joined respectively onto the pair of bending bars so as to bend the pair of bending bars in opposite directions to cause pivotal movement to the drive mass portion, the pivotal movement of the drive mass portion causing torsional deformation to the second elastic connecting portion so as to pivot the movable mass portion thereby providing a two-degree-of-freedom vibration system
   wherein each of the drive mass portion and the movable mass portion is in the form of a quadrangular in a plan view thereof and has a pair of sides which are arranged parallel to the pivotal axis and symmetrically with the pivotal axis interposed therebetween, and
   wherein the first connecting portion of each of the bending bars is connected to the drive mass portion at a position between the pivotal axis and one of the sides of the drive mass portion.

2. The actuator as recited in claim 1, wherein each of the pair of piezoelectric elements includes:
   a piezoelectric layer mainly made of a piezoelectric material, and
   a pair of electrodes holding the piezoelectric layer therebetween, one of the pair of electrodes being joined to the bending bar.

3. The actuator as recited in claim 1, wherein each of the pair of piezoelectric elements extends in a longitudinal direction of the bending bar and is capable of expansion and contraction in the longitudinal direction of the bending bar to bend the bending bar.

4. The actuator as recited in claim 1, wherein each of the pair of piezoelectric elements is provided on at least one surface of the bending bar in a direction perpendicular to a longitudinal direction of the bending bar and perpendicular to a direction in which the pair of bending bars are opposed.

5. The actuator as recited in claim 1, wherein each of the pair of piezoelectric elements is provided on both surfaces of the bending bar in a direction perpendicular to a longitudinal direction of the bending bar and perpendicular to a direction in which the pair of bending bars are opposed.

6. The actuator as recited in claim 1, wherein the pair of piezoelectric elements are arranged symmetrically with respect to the pivotal axis of the drive mass portion.

7. The actuator as recited in claim 1, wherein each of the pair of drive mechanisms is configured to maintain a relationship of A<B where A represents an interval between the first connecting portion of a first of the pair of bending bars and the first connecting portion of a second of the pair of bending bars, and B represents an interval between the second connecting portion of the first of the pair of bending bars and the second connecting portion of the second of the pair of bending bars.

8. The actuator as recited in claim 1, wherein each of the pair of drive mechanisms is configured to maintain a relationship of $0 \leq A < 0.8$ L where A represents an interval between the first connecting portion of a first of the pair of bending bars and the first connecting portion of a second of the pair of bending bars, and L represents a maximum length of the drive mass portion in a direction perpendicular to the pivotal axis of the drive mass portion.

9. The actuator as recited in claim 1, wherein each of the pair of drive mechanisms is configured to maintain a relationship of 0.2 L<B<1.2 L where B represents an interval between the second connecting portion of a first of the pair of bending bars and the second connecting portion of a second of the pair of bending bars, and L represents a maximum length of the drive mass portion in a direction perpendicular to the pivotal axis.

10. The actuator as recited in claim 1, wherein each of the pair of drive mechanisms is configured to maintain a relationship of A<C where A represents an interval between the first connecting portion of a first of the pair of bending bars and the first connecting portion of a second of the pair of bending bars, and C represents a length of the bending bar.

11. The actuator as recited in claim 1, further comprising a power source configured to apply an alternating voltage to the piezoelectric elements, the alternating voltage having a frequency substantially equal to a lower frequency of resonance frequencies for the two-degree-of-freedom vibration system at which the drive mass portions and the movable mass portion produce resonance.

12. The actuator as recited in claim 1, wherein the drive mass portions in the pair of drive mechanisms have substantially the same length $D_d$.

13. The actuator as recited in claim 1, wherein each of the pair of drive mechanisms is configured to maintain a relationship of $k_1 > k_2$ where $k_1$ represents a spring constant of the first elastic connecting portion, and $k_2$ represents a spring constant of the second elastic connecting portion.

14. The actuator as recited in claim 1, wherein each of the pair of drive mechanisms is configured to maintain a relationship of $J_1 \leq J_2$ where $J_1$ represents a moment of inertia of the drive mass portion, and $J_2$ represents a moment of inertia of the movable mass portion.

15. The actuator as recited in claim 1, further comprising a light reflection portion formed on the movable mass portion.

16. The actuator as recited in claim 1, wherein each of the pair of drive mechanisms is configured to maintain a relationship of $D_d < D_m$ where $D_d$ represents a length of the drive mass portion from the pivotal axis to one of the sides thereof, and $D_m$ represents a length of the movable mass portion from the pivotal axis to one of the sides thereof.

17. The actuator as recited in claim 1, wherein a width of the drive mass portion that is parallel to the pivotal axis is wider than a width of each of the bending bars.

* * * * *